LE ROY BLADES.
SIGN.
APPLICATION FILED SEPT. 10, 1915.
1,289,371.
Patented Dec. 31, 1918.
3 SHEETS—SHEET 1.
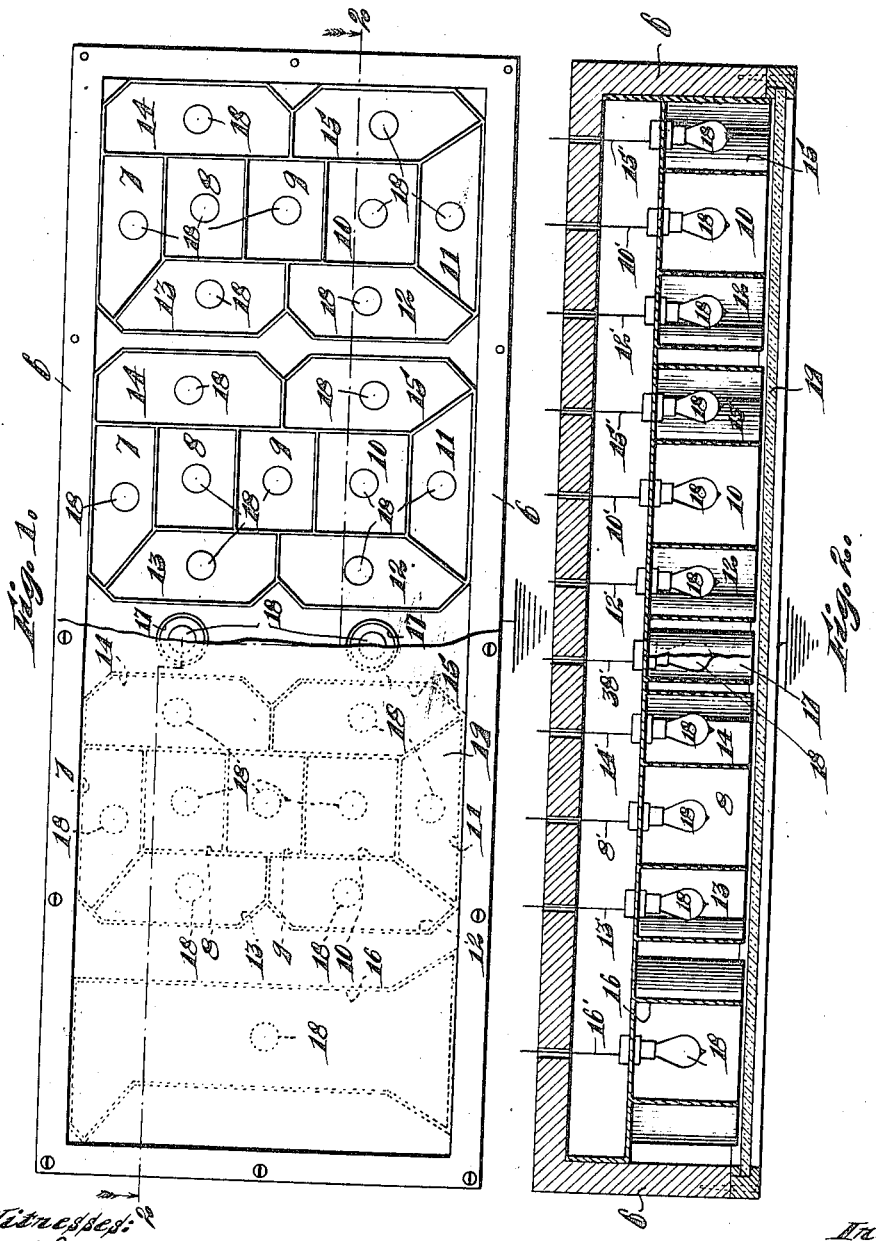

LE ROY BLADES.
SIGN.
APPLICATION FILED SEPT. 10, 1915.
1,289,371.
Patented Dec. 31, 1918.
3 SHEETS—SHEET 2.
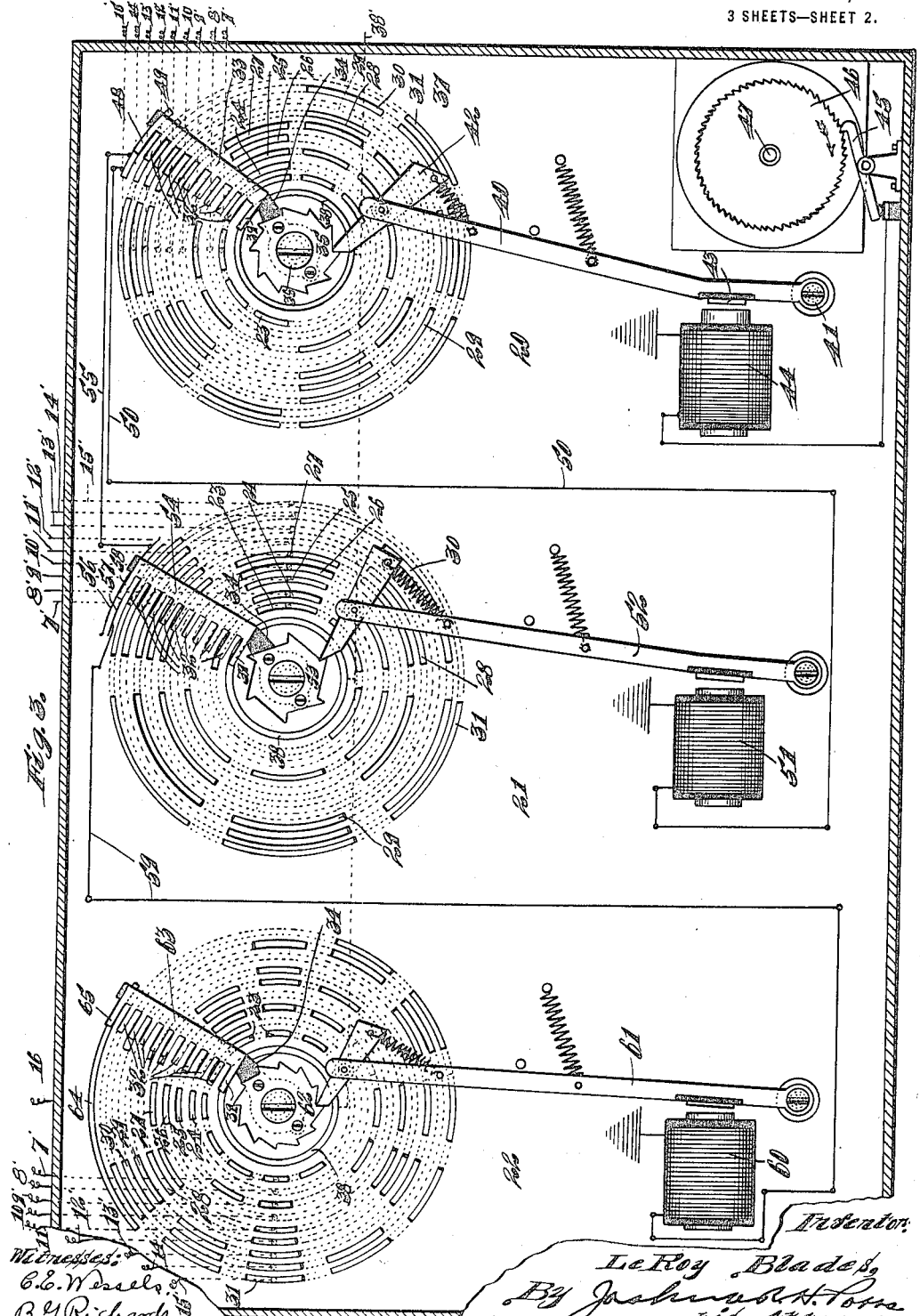

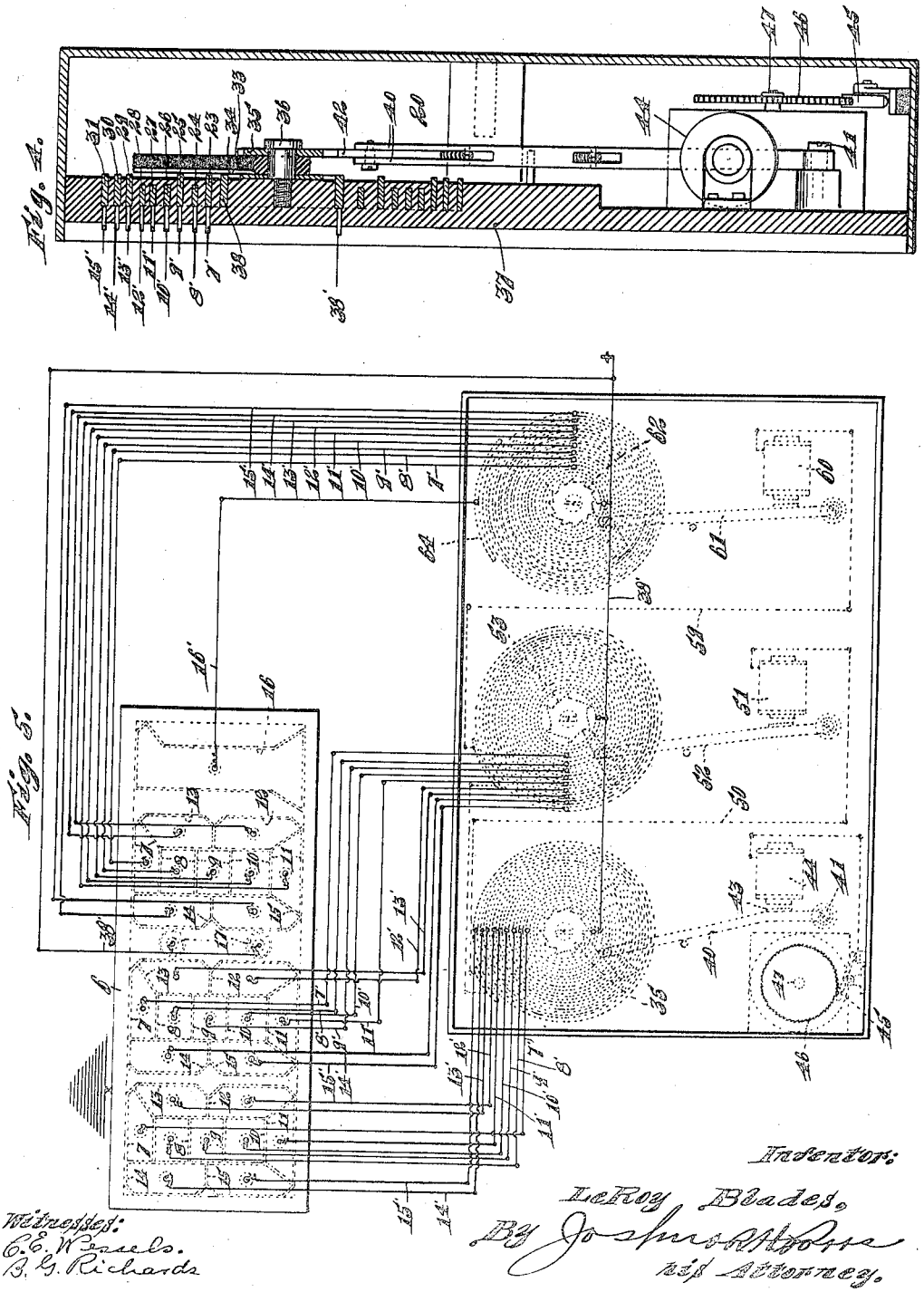

UNITED STATES PATENT OFFICE.

LE ROY BLADES, OF CHICAGO, ILLINOIS, ASSIGNOR OF ONE-THIRD TO ERNEST G. MOLLOHAN AND ONE-THIRD TO EARLE T. MOLLOHAN, BOTH OF CHICAGO, ILLINOIS.

SIGN.

1,289,371.    Specification of Letters Patent.    Patented Dec. 31, 1918.

Application filed September 10, 1915. Serial No. 49,981.

*To all whom it may concern:*

Be it known that I, LE ROY BLADES, a citizen of the United States, and a resident of the city of Chicago, county of Cook, and State of Illinois, have invented certain new and useful Improvements in Signs, of which the following is a specification.

My invention relates to improvements in signs especially adapted for use for indicating the time of day and has for its object the provision of an improved construction of this character which is efficient in use and simple in construction.

The invention consists in the combinations and arrangements of parts hereinafter described and claimed.

The invention will be best understood by reference to the accompanying drawings forming a part of this specification, and in which, Figure 1 is a face view of a sign member embodying a portion of my invention with a portion of the face plate thereof removed to show internal parts, Fig. 2, a longitudinal section taken on line 2—2 of Fig. 1, Fig. 3, a view illustrating electric contact mechanisms employed in the construction, Fig. 4, a section through one of the electrical contact arrangements, and Fig. 5, a diagrammatic view illustrating the electrical wiring employed.

The preferred form of construction, as illustrated in the drawings comprises a suitable sign casing 6 which is divided by partitions into different compartments. These partitions are arranged to form three separate identical sets of compartments different combinations of which are arranged to coöperate to indicate numerals from 0 to 9. Each set of compartments comprises five vertically arranged compartments 7, 8, 9, 10 and 11, the uppermost compartment 7 being of a shape to indicate the top of a figure 1 and the lowermost compartment 11 being shaped to indicate the base of a figure 1, the compartments 8, 9 and 10 being shaped to indicate the stem thereof. Compartments 12 and 13 are positioned on one side and 14 and 15 on the other, said compartments 12, 13, 14 and 15 being shaped to indicate the sides of a figure 8. These different compartments are so arranged and shaped that different combinations thereof will indicate roughly numerals from 0 to 9. Thus compartments 7, 8, 9, 10 and 11 indicate the figure 1. Compartments 7, 14, 9, 12 and 11 indicate the figure 2, and compartments 7, 14, 9, 15 and 11 indicate the numeral 3 and so on, as will be readily understood. To the left of the compartments above described, a single compartment 16, in the form of a figure 1, is arranged and a compartment 17 is arranged centrally, as indicated, two electric light bulbs 18 being positioned in compartment 17, one electric light bulb 18 being positioned in each of the other compartments as indicated, a glass plate 19 being arranged over the faces of all of the compartments. Electrical contact mechanisms 20, 21 and 22 are arranged in a suitable casing to govern the lights in the different sets of compartments 7—15, the mechanism 20 corresponding to the set of compartments at the extreme right of Fig. 1, the mechanism 21 corresponding with the set of compartments immediately to the left thereof, and the mechanism 22 corresponding to the other set of compartments. The electric contact mechanisms for each set of the compartments 7—15 are very similar, so that a description of one will substantially suffice for all. Each of these contact mechanisms comprises a plurality of annular rings 23, 24, 25, 26, 27, 28, 29, 30 and 31 corresponding respectively to the compartments 7, 8, 9, 10, 11, 12, 13, 14 and 15 and connected with the lights in these respective compartments by means of wires 7', 8', 9', 10', 11', 12', 13', 14' and 15'. The lights in each compartment are grounded at one side, as indicated, so that when current is supplied to any one of the corresponding rings, the light in the corresponding compartment will be lighted, as will be readily understood. The contact rings are embedded in a backing plate 37 so as to be insulated from each other and are provided with raised lands or surfaces projecting from the inner face of the backing plate 37 adapted to contact with spring contact fingers 32 formed on a contact plate 33, said contact plate 33 being mounted on a revolving arm 34 fixed to a ratchet wheel 35 revoluble on a stud shaft 36 mounted in the backing plate 37. Another annular ring 38 is also mounted in the backing plate 37 in position to contact constantly with a spring finger 39 on contact member 33, the contact member 33 being constantly provided with current through the ring 38 supplied from the supply wire by means of the wire 38'. An oscillatory spring held lever 40 is pivotally mounted at 41 and carries a spring held pawl 42 coöperating with ratchet 35, the ratchet 35 being provided with ten teeth as shown. Lever 40 carries an armature 43 coöperating with an electromagnet 44 arranged in circuit with an oscillatory switch 45 coöperating with a toothed wheel 46 on the minute hand 47 of an ordinary clock mechanism, the wheel 46 being provided with sixty teeth.

The arrangement is such that as wheel 46 revolves, the teeth therein cause oscillations of lever 45 thus making and breaking the circuit through magnet 44. At each closing of the circuit through magnet 44, the lever 40 is operated to rotate ratchet 35 through an angular distance corresponding to one of its teeth. This likewise rotates the contact member 33 through a corresponding angular distance. The lands on the rings 23—31 are arranged in sets corresponding to the desired sets of compartments in the corresponding set in the casing 6, so that at each movement of the contact 33 a different set of rings will be contacted with and supplied with current thus, at each movement of contact member 33 lighting a different set of compartments and indicating a different unit for the minutes of the time. Thus, in the position indicated in Fig. 3, the contact member 33 is in position to light the compartments 11, 12, 13, 7, 14 and 15 to indicate the letter 0 on the sign. At the next movement of contact 33, the compartments 7, 8, 9, 10 and 11 will be lighted to indicate the figure 1 and so on through the complete revolution of the contact 33, said contact 33 revolving six times for each revolution of wheel 46 or that is six times in an hour, thus repeating the corresponding numerals six times in an hour.

A finger 48 is arranged on contact 33 outside of the fingers 32 and is arranged to contact with the single contact 49 when zero is indicated by the corresponding set of compartments. The contact 49 is connected by means of a wire 50 with electro-magnet 51 coöperating with an oscillatory lever 52 similar in all respects to lever 40 and arranged to operate a ratchet 53 having six equally spaced teeth. Ratchet 53 carries a contact 54 having the fingers 32, 39 and 58 coöperating with lands formed on the rings 23—31 in the contact apparatus 21 so as to operate the compartments in the set next to the left of the one above described. By this arrangement, it will be observed, that at each indication of 0 by the set of compartments first described, the next set of compartments to the left will be properly illuminated to properly indicate the minutes of the time as the minute hand shaft 47 revolves.

Contact 49 is also connected by means of a wire 55 with a contact 56 coöperating with a parallel contact 57, said contacts 56 and 57 being arranged in the path of a finger 58 formed on contact member 54 outside of the corresponding contact fingers 32, said finger 58 being arranged to electrically join the contacts 56 and 57 when the contact 54 is over the lands in the mechanism 21 corresponding to zero. Contact 57 is connected by means of a wire 59 with an electro-magnet 60 coöperating with a lever 61 to operate a ratchet 62 carrying a contact 63 as before. The contact 63 is provided with the contact fingers 32 and 39 coöperating with the rings 23—31—38 to operate the next set of compartments to indicate the units of the hour. By this arrangement it will be observed, that as the contact 54 passes the corresponding zero point, if the contact 33 is at the same time on the zero point, the electromagnet 60 will be excited to move arm 63 to the next set of contacts so that at the end of each six revolutions of contact 33, or at the end of each hour, the magnet 60 will be excited to move the contact 63 up to illuminate the corresponding set of compartments.

A long contact 64 is arranged outside of a duplicate set of contact lands in the mechanism 22 corresponding to 0, 1 and 2, said contact 64 being connected by means of a wire 16' with the light in compartment 16, so that as said duplicate sets of compartments are illuminated, the compartment 16 will be constantly illuminated, thus providing for the indication of the hours 10, 11 and 12, as will be readily understood.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A sign comprising an electric circuit; a rotatable electric contact member; a plurality of stationary electric contacts coöperating with said rotatable contact; electric sign lights operatively connected with said stationary contacts; a second set of rotatable electric contacts; a second set of a plurality of stationary electric contacts coöperating with said second rotatable contacts; electrical connections with said first set of contacts for operating said second set of rotatable contacts; electric sign lights operatively connected with said second stationary contacts; a third set of rotatable electric contacts; a third set of a plurality of stationary electric contacts coöperating with said third rotatable contacts; electrical connections with said second set of contacts for operating said third set of rotatable contacts, and electric sign lights operatively connected with said third stationary contacts, substantially as described.

2. A sign comprising an electric circuit; a toothed wheel; clock mechanism rotating said wheel; a reciprocatory switch operable by said wheel to open and close said circuit; an electro-magnet in said circuit; a spring held dog operable by said magnet through closing of said circuit; a ratchet operable by said dog; a rotatable electric contact member operable by said ratchet; a plurality of stationary electric contacts coöperating with said rotatable contact; electric sign lights operatively connected with said stationary contacts; a second set of rotatable electric contacts; a second set of a plurality of stationary electric contacts coöperating with said second rotatable electric contacts; electrical connections with said first set of contacts for operating said second set of rotatable contacts; electric sign lights operatively connected with said second stationary contacts; a third set of rotatable electric contacts; a third set of a plurality of stationary electric contacts coöperating with said third rotatable electric contacts; electrical connections with said second set of contacts for operating said third set of rotatable contacts, and electric sign lights operatively connected with said third stationary contacts, substantially as described.

3. A sign comprising a casing divided into a plurality of compartments, said casing being equipped with three sets of compartments, each set being arranged to coöperate together in different combinations to form different numerals and each set consisting of five compartments arranged one above the other, the uppermost compartment being substantially in the form of the top of a figure 1 and the lowermost compartment being substantially in the form of the base of the figure 1, and two side compartments arranged at each side of said central compartments, said side compartments being substantially in the form of the sides of a figure 8, and a compartment at the left of the above mentioned sets of compartments in substantially the form of a figure 1; an electric circuit; a toothed wheel; clock mechanism rotating said wheel; a reciprocatory switch operable by said wheel to open and close said circuit; an electro-magnet in said circuit; a spring held dog operable by said magnet through closing of said circuit; a ratchet operable by said dog; a rotatable electric contact member operable by said ratchet; a plurality of stationary electric contacts coöperating with said rotatable contact and connected to illuminate different combinations of compartments in one of said sets of compartments; a second set of rotatable electric contacts; a second set of a plurality of stationary electric contacts coöperating with stationary electric contacts coöperating with said second rotatable electric contacts and connected to illuminate another of said sets of compartments; electrical connections with said first set of contacts for operating said second set of rotatable contacts; a third set of rotatable electric contacts; a third set of a plurality of stationary electric contacts coöperating with said third rotatable electric contacts and connected to illuminate a third set of said compartments; electrical connections with said second set of contacts for operating said third set of rotatable contacts, and a stationary electric contact coöperating with certain of said third set of stationary contacts to maintain the compartment in the form of a figure 1 illuminated, substantially as described.

In testimony whereof I have signed my name to this specification in the presence of two subscribing witnesses.

LE ROY BLADES.

Witnesses:
 JOSHUA R. H. POTTS,
 HELEN F. LILLIS.